(12) United States Patent
Bates et al.

(10) Patent No.: US 8,859,646 B2
(45) Date of Patent: *Oct. 14, 2014

(54) POLY(PHENYLENE ETHER) PROCESS

(75) Inventors: Gary Mell Bates, Voorheesville, NY (US); Nitin Vilas Tople, Evansville, IN (US); Scott Michael Fisher, Delmar, NY (US); Hua Guo, Beijing (CN)

(73) Assignee: Sabic Global Technologies B.V. (NL)

( * ) Notice: Subject to any disclaimer, the term of this patent is extended or adjusted under 35 U.S.C. 154(b) by 88 days.

This patent is subject to a terminal disclaimer.

(21) Appl. No.: 13/417,451

(22) Filed: Mar. 12, 2012

(65) Prior Publication Data

US 2013/0225783 A1 Aug. 29, 2013

Related U.S. Application Data

(60) Provisional application No. 61/604,029, filed on Feb. 28, 2012.

(51) Int. Cl.
*C08F 6/08* (2006.01)
*C08G 65/38* (2006.01)

(52) U.S. Cl.
USPC .......................... 523/332; 528/212; 528/496

(58) Field of Classification Search
USPC .......................................... 523/332; 528/496
See application file for complete search history.

(56) References Cited

U.S. PATENT DOCUMENTS

| | | | |
|---|---|---|---|
| 2,622,797 A | 2/1950 | Hemfort | |
| 3,838,102 A | 9/1974 | Bennett et al. | |
| 4,157,434 A | 6/1979 | Floryan et al. | |
| 4,237,265 A | 12/1980 | Eliassen et al. | |
| 4,246,398 A * | 1/1981 | Sugio et al. | 528/496 |
| 4,436,870 A | 3/1984 | Hinselmann et al. | |
| 4,482,705 A | 11/1984 | Hambrecht et al. | |
| 4,614,598 A | 9/1986 | Zettier et al. | |
| 4,654,418 A | 3/1987 | Berger et al. | |
| 4,755,165 A | 7/1988 | Gunnewig | |
| 6,332,987 B1 | 12/2001 | Whitney et al. | |
| 6,576,738 B2 | 6/2003 | Braat et al. | |
| 6,897,282 B2 | 5/2005 | Freshour et al. | |
| 6,962,965 B2 | 11/2005 | Yeager | |
| 7,329,708 B2 | 2/2008 | Birsak et al. | |
| 7,595,367 B2 | 9/2009 | Carrillo et al. | |
| 8,466,253 B1 * | 6/2013 | Kumar et al. | 528/193 |
| 2005/0049362 A1 | 3/2005 | Buckley et al. | |
| 2005/0178718 A1 | 8/2005 | Geibel et al. | |
| 2007/0299243 A1 | 12/2007 | Delsman et al. | |
| 2008/0051522 A1 | 2/2008 | Birsak et al. | |
| 2008/0246173 A1 | 10/2008 | Braidwood et al. | |
| 2009/0211967 A1 | 8/2009 | Delsman et al. | |

FOREIGN PATENT DOCUMENTS

| | | |
|---|---|---|
| GB | 884768 | 12/1961 |
| KR | 10-1996-0004115 A1 | 3/1996 |

OTHER PUBLICATIONS

International Search Report and Written Opinion; International Filing Date Dec. 13, 2012; Date of Mailing Mar. 27, 2013; Agent's File Reference P020413PCT (P020413US); 11 pages.

\* cited by examiner

*Primary Examiner* — Tae H Yoon
(74) *Attorney, Agent, or Firm* — Cantor Colburn LLP

(57) ABSTRACT

A method of purifying a poly(phenylene ether) is described. The method includes mixing a poly(phenylene ether) solution comprising a poly(phenylene ether) and a poly(phenylene ether) solvent with first washing solvents including a C1-C4 alkanol and water to form a first liquid phase including poly(phenylene ether) and poly(phenylene ether) solvent, and a second liquid phase comprising C1-C4 alkanol and water, and separating the first liquid phase from the second liquid phase. The first and second liquid phases combined comprise about 60 to about 95 weight percent poly(phenylene ether) solvent, about 4 to about 32 weight percent C1-C4 alkanol, and about 1 to about 36 weight percent water. When optionally combined with evaporative removal of the poly(phenylene ether) solvent, the method reduces C1-C4 alkanol usage compared to the antisolvent precipitation method, and it produces poly(phenylene ether) having reduced catalyst metal ion residue and reduced color.

27 Claims, 1 Drawing Sheet

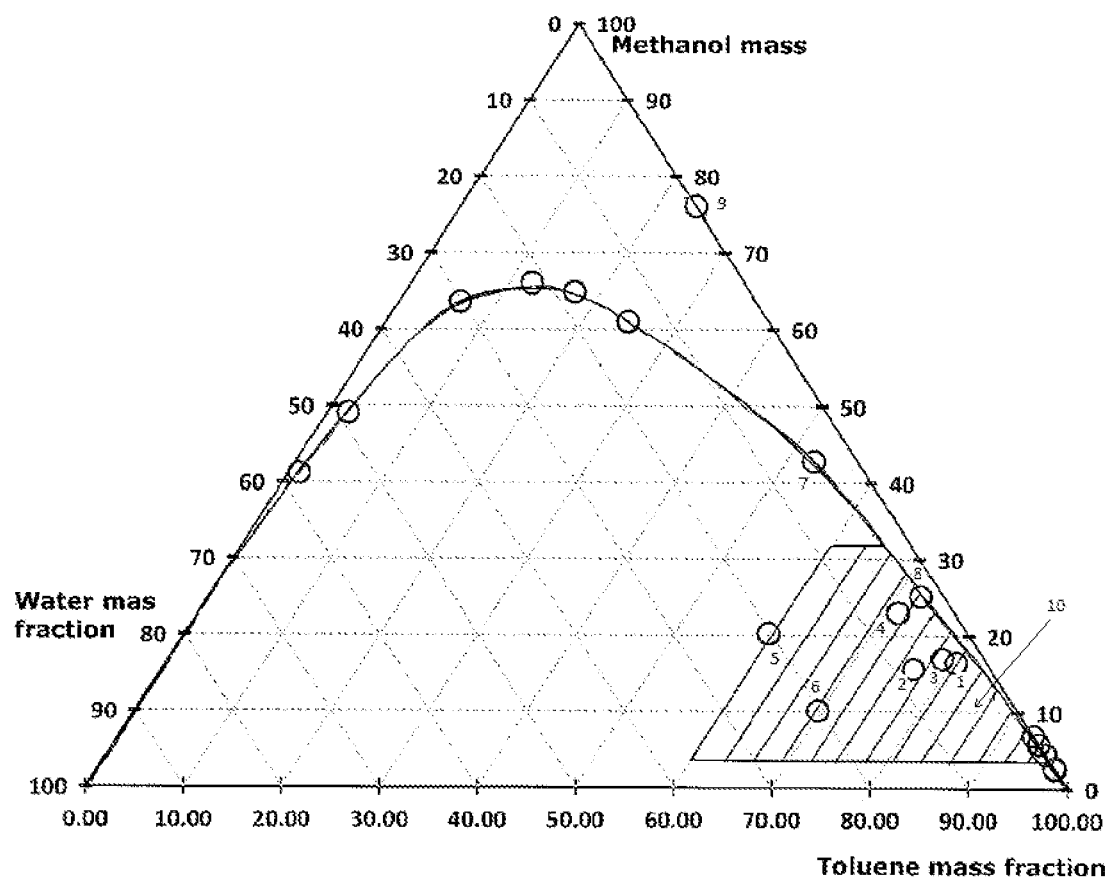

POLY(PHENYLENE ETHER) PROCESS

CROSS REFERENCE TO RELATED APPLICATIONS

This application claims priority to U.S. Provisional Application Ser. No. 61/604,029 filed on Feb. 28, 2012, which is incorporated herein by reference in its entirety.

BACKGROUND OF THE INVENTION

Poly(phenylene ether)s are a class of plastics known for excellent water resistance, dimensional stability, and inherent flame retardancy, as well as high oxygen permeability and oxygen/nitrogen selectivity. Properties such as strength, stiffness, chemical resistance, and heat resistance can be tailored by blending poly(phenylene ether)s with various other plastics in order to meet the requirements of a wide variety of consumer products, for example, plumbing fixtures, electrical boxes, automotive parts, and insulation for wire and cable.

Due to its widespread use, improvements in the method of making poly(phenylene ether)s remains an active area of research. In general, poly(phenylene ether)s are synthesized by oxidative polymerization of a sterically hindered phenol in the presence of a poly(phenylene ether) solvent, a catalyst metal ion, and at least one catalyst amine ligand. In general, a poly(phenylene ether) reaction mixture thus includes not only the desired poly(phenylene ether), but also poly(phenylene ether) solvent, catalyst metal ion, and catalyst amine ligand, as well as colored impurities and odorous impurities. When the poly(phenylene ether) is isolated from the reaction mixture, catalyst metal ion, catalyst amine ligands, colored impurities, and odorous impurities must all be reduced to acceptable levels. If the colored impurities and the catalyst metal ions are not removed from the poly(phenylene ether), it will suffer from poor thermal and oxidative stability, and it will discolor during melt blending, extrusion, and molding above about 250° C.

One purification method for poly(phenylene ether)s comprises precipitation of solid poly(phenylene ether) from a solution in the poly(phenylene ether) solvent, for example toluene, with an antisolvent for poly(phenylene ether), for example methanol. In this method, the precipitated poly(phenylene ether) is filtered, washed with antisolvent, and optionally reslurried with antisolvent, filtered, and washed again. Residual antisolvent is then removed by drying. Drawbacks to this method are the capital costs of solids handling equipment, the relatively high cost for the processing of solid poly(phenylene ether), and the large volumes of antisolvent that are required.

The catalyst metal ion, for example copper ion, can be removed by washing the poly(phenylene ether) solution in the poly(phenylene ether) solvent with an aqueous solution of a chelating agent. See, for example, U.S. Pat. No. 3,838,102 to Bennett. U.S. Pat. No. 4,237,265 to Eliassen et al. discloses a cocurrent or countercurrent liquid-liquid extraction in an extractor such that a continuous aqueous phase is maintained while a discrete poly(phenylene ether) solution phase is continuously contacted by the aqueous phase. The aqueous phase is a mixture of water and an alkanol having 1 to 4 carbon atoms. This process requires an a relatively large volume of aqueous phase relative to the poly(phenylene ether) solution phase, in particular a volume ratio of aqueous phase to poly (phenylene ether) solution phase of 1:1 to 10:1, with a chelating agent in the aqueous phase. This method has at least two disadvantages. First relatively large amounts of the aqueous phase comprising water and alkanol are used relative to the amount of poly(phenylene ether) produced, which means that a large amount of alkanol is used. This high alkanol usage adds to the cost of the process. Also, since the aqueous phase contains a large amount of a flammable alkanol, the alkanol must be removed from the water before the water can be disposed of. For example, when the alkanol is methanol, the methanol must be removed from the waste water by distillation, a highly energy-intensive process.

Another approach to catalyst removal is disclosed in U.S. Pat. No. 4,654,418 to Berger et al. The poly(phenylene ether) solution is combined with an aqueous chelating agent solution in a mixing step, sent to a settler where the phases are separated, and the process is repeated with additional aqueous chelating agent solution. The aqueous chelating agent solution is recycled from the second step to the first step, which improves the overall organic to aqueous phase ratio to 1.0:0.1 to 1:1.0. However, since it is a continuous process, two mixing tanks and two settling tanks are required. Moreover, Berger is silent as to the effectiveness of the process to remove colored impurities from the poly(phenylene ether).

Another approach to catalyst removal is disclosed in U.S. Pat. No. 6,576,738 to Braat et al. Braat describes a process for removal of the copper catalyst from a poly(phenylene ether) solution by adding at least one polar solution to form a two phase mixture. The two phases are separated using a liquid/liquid centrifuge. A polar solvent is added to the separated poly(phenylene ether) solution to form a second two phase mixture, which is also separated using a liquid/liquid centrifuge. The resulting poly(phenylene ether) solution has a copper content of less than about 1.1 milligrams per kilogram (1.1 ppm). Due to a low density difference between the aqueous phase and the poly(phenylene ether) solution, a liquid/liquid centrifuge is required to achieve phase separation. A related approach to catalyst removal is disclosed in U.S. Patent Application Publication No. US2007/0299243 A1 to Delsman et al. In Delsman, a poly(phenylene ether) solution and a chelating agent solution are also separated in a liquid/liquid centrifuge. However, the centrifuge residence time is less than or equal to 60 seconds. Two aqueous washes, the first comprising a chelating agent, are required to obtain copper levels of less than 1 milligram per kilogram (1 ppm). Copper levels of less than milligram per kilogram (1 ppm) could not be achieved by gravity separation of the poly(phenylene ether) solution and aqueous washes. Delsman is silent as to the effectiveness of the process to remove colored impurities from the poly(phenylene ether).

There remains a need in the art for a poly(phenylene ether) purification process which overcomes the problems associated with precipitation of solid poly(phenylene ether) with an antisolvent, i.e. the capital costs of solids handling equipment, the relatively high cost for the processing of solid poly(phenylene ether), and the large volumes of antisolvent that are required. There also remains a need in the art for a poly(phenylene ether) purification process which reduces the amount of antisolvent used. It is desirable that the process not only removes catalyst metal ions, but also removes colored impurities, thereby improving both the color, and the thermal and oxidative stability, of the isolated poly(phenylene ether).

BRIEF DESCRIPTION OF THE INVENTION

The present invention relates to a method of purifying a poly(phenylene ether), comprising mixing a poly(phenylene ether) solution comprising a poly(phenylene ether) and a poly(phenylene ether) solvent selected from the group consisting of toluene, xylenes, mesitylene, chlorobenzene, dichlorobenzenes, chloroform, and combinations thereof, and first washing solvents comprising a C1-C4 alkanol and water to form a first liquid phase comprising poly(phenylene ether) and poly(phenylene ether) solvent, and a second liquid phase comprising C1-C4 alkanol and water; and separating the first liquid phase from the second liquid phase; wherein the first liquid phase and the second liquid phase are present in a volume ratio of about 1.5:1 to about 10:1; wherein the first and second liquid phases combined comprise, based on 100 weight percent total of the poly(phenylene ether) solvent, the C1-C4 alcohol, and the water, about 60 to about 95 weight percent poly(phenylene ether) solvent, about 4 to about 32 weight percent C1-C4 alkanol, and about 1 to about 36 weight percent water; and wherein the first liquid phase comprises at least 95 weight percent of the poly(phenylene ether) in solution.

One embodiment of the present invention is a method of purifying a poly(phenylene ether), comprising mixing a poly(phenylene ether) solution comprising a poly(phenylene ether) and toluene, and first washing solvents comprising methanol and water to form a first liquid phase comprising poly(phenylene ether) and toluene, and a second liquid phase comprising methanol and water; and separating the first liquid phase from the second liquid phase; wherein the poly(phenylene ether) solution and the first washing solvents are mixed in a volume ratio of about 2:1 to about 7:1; wherein the first and second liquid phases combined comprise, based on 100 weight percent total of the toluene, the methanol, and the water, about 60 to about 90 weight percent toluene, about 9 to about 25 weight percent methanol, and about 1 to about 10 weight percent water; and wherein the first liquid phase comprises at least 95 weight percent of the poly(phenylene ether) in solution.

These and other embodiments are described in detail below.

BRIEF DESCRIPTION OF THE DRAWING

FIG. 1 is a phase diagram for mixtures of methanol, water, and toluene, wherein the solvent compositions of the first and second liquid phases combined of Examples 1-8 and Comparative Example 1 are plotted.

DETAILED DESCRIPTION OF THE INVENTION

The present inventors sought an improved method for the purification of poly(phenylene ether)s which reduces antisolvent usage in comparison to the antisolvent precipitation method, and thereby reduces the overall cost of purification. As a result, the present inventors have determined that antisolvent usage can be significantly reduced while producing substantially pure poly(phenylene ether) by the method of washing a poly(phenylene ether) solution with washing solvents comprising a C1-C4 alkanol and water described herein. The method can reduce antisolvent usage by a factor of 10 or more. The reduction in antisolvent usage results in reduced raw material cost, and reduced energy cost by virtue of reduced amounts of used antisolvent to recover by distillation. Moreover, the method itself requires less capital equipment and consumes less energy than the antisolvent precipitation method.

Not only does the method reduce antisolvent usage and costs, but it is also highly effective in reducing catalyst metal ion and colored impurity contents in poly(phenylene ether). The catalyst metal ion levels obtained by the method are comparable to the catalyst metal ion levels obtained by the antisolvent precipitation method, and the color of the poly(phenylene ether) is equal to or better than that obtained in the antisolvent precipitation method. By virtue of reducing the catalyst metal ion content and colored impurities, the thermal and oxidative stability of poly(phenylene ether) is significantly improved by this method as well.

When the method is coupled with distillation of poly(phenylene ether) solvent from the purified poly(phenylene ether), the content of odorous impurities is also reduced. Another advantage of the method is that catalyst amine ligands remain substantially in the poly(phenylene ether) solvent-rich layer, where they can be removed by distillation along with the poly(phenylene ether) solvent. This minimizes amine contamination of the used C1-C4 alkanol-water wash, which simplifies recovery of C1-C4 alkanol from the used washing solvents. In some embodiments, the separation of poly(phenylene ether) solution and washing solvents can be accomplished by gravity settling. This eliminates the need for centrifugation, which further reduces the capital equipment and energy costs for the method.

Thus, one embodiment is a method of purifying a poly(phenylene ether), comprising mixing a poly(phenylene ether) solution comprising a poly(phenylene ether) and a poly(phenylene ether) solvent, and first washing solvents comprising a C1-C4 alkanol and water to form a first mixture comprising a first liquid phase comprising poly(phenylene ether) and poly(phenylene ether) solvent selected from the group consisting of toluene, xylenes, mesitylene, chlorobenzene, dichlorobenzenes, chloroform, and combinations thereof, and a second liquid phase comprising C1-C4 alkanol and water; and separating the first liquid phase from the second liquid phase; wherein the poly(phenylene ether) solution and the first washing solvents are mixed in a volume ratio of about 1.5:1 to about 10:1; wherein the first and second liquid phases combined comprises, based on 100 weight percent total of the poly(phenylene ether) solvent, the C1-C4 alcohol, and the water, about 60 to about 95 weight percent poly(phenylene ether) solvent, about 4 to about 32 weight percent C1-C4 alkanol, and about 1 to about 36 weight percent water; and wherein the first liquid phase comprises at least 95 weight percent of the poly(phenylene ether) in solution. In some embodiments, the total amount of C1-C4 alkanol and water in the first and second liquid phases combined can be at least 10 weight percent, based on 100 weight percent total of the poly(phenylene ether) solvent, the C1-C4 alkanol, and the water.

The amounts of poly(phenylene ether) solvent, C1-C4 alkanol and water are such that the first liquid phase is in excess of the second liquid phase on a volume basis. For example, the volume ratio of the first liquid phase to the second liquid phase can be about 1.5:1 to about 10:1, specifically about 2:1 to about 8:1, more specifically about 2:1 to about 7:1, and still more specifically about 2:1 to about 6:1.

C1-C4 alkanols and water are antisolvents for the poly(phenylene ether), that is the poly(phenylene ether) is not soluble in C1-C4 alkanols or water. Thus, when a C1-C4 alkanol and water are added to a poly(phenylene ether) solution comprising a poly(phenylene ether) and an poly(phenylene ether) solvent, the poly(phenylene ether) can precipitate. This is the basis of the methanol precipitation method for purifying poly(phenylene ether)s in which the poly(phenylene ether) is precipitated from solution in toluene by dilution with methanol. The inventors have surprisingly determined that when the first and second liquid phases combined comprise about 60 to about 95 weight percent poly(phenylene ether) solvent, about 4 to about 32 weight percent C1-C4 alkanol, and about 1 to about 36 weight percent water based on 100 weight percent total of the poly(phenylene ether) solvent, the C1-C4 alcohol, and the water, precipitation of the poly(phenylene ether) is minimized or completely avoided, and the poly(phenylene ether) remains in solution in the first liquid phase. Thus, in some embodiments, the first liquid phase comprises at least 95 weight percent of the poly(phenylene ether) in solution, specifically at least 97 weight percent, more specifically at least 99 weight percent, and still more specifically 100 weight percent of the poly(phenylene ether) in solution. Therefore, the method is distinguished from methods in which a poly(phenylene ether) dissolved in poly(phenylene ether) solvent is mixed with a C1-C4 alkanol-containing antisolvent in order to intentionally precipitate the poly(phenylene ether).

The method further comprises separating the first liquid phase from the second liquid phase. The separating can be done using known liquid-liquid separation methods. In some embodiments, separating the first and second liquid phases comprises the use of gravity. In gravity separation, the combined first and second phases are allowed to stand without agitation until two distinct layers are formed. The denser bottom layer can be removed from the bottom of the separation vessel. Alternatively, the lighter top layer can be removed by siphoning above the first and second liquid phase interface. In some embodiments, the first liquid phase comprising poly(phenylene ether) and poly(phenylene ether) solvent is more dense than the second liquid phase comprising C1-C4 alkanol and water, so the first liquid phase is the bottom layer. In other embodiments, the second liquid phase is more dense than the first liquid phase, so that the second liquid phase is the bottom layer.

It is generally desirable to conduct the mixing and separating steps above room temperature in order to prevent the poly(phenylene ether) from precipitating from solution, to reduce the viscosity of the poly(phenylene ether) solution, and to facilitate separation of the first and second liquid phases. The minimum temperature is the temperature at which the viscosity of the poly(phenylene ether) solution is sufficiently high to permit facile mixing and separating of the first and second liquid layers. The maximum temperature is determined in part by the boiling point of the lowest boiling component of the first and second liquid phases. The lowest boiling component can be an azeotrope. It is desirable to use a temperature at or near the boiling point of the lowest boiling component so that boiling and evaporation of the lowest boiling component from the first and second liquid phases is minimized or eliminated. For example, when the poly(phenylene ether) solvent is toluene, and the C1-C4 alkanol is methanol, the lowest boiling component is methanol, which boils at 64-65° C. Thus, when the poly(phenylene ether) solvent is toluene and the C1-C4 alkanol is methanol, the mixing and the separating can be conducted at about 30 to about 70° C., specifically about 50 to about 70° C., more specifically about 60 to about 67° C., and still more specifically about 64 to about 67° C. A temperature slightly higher than the boiling point of the lowest boiling component can be acceptable when, for example, the reactor is equipped with a reflux condenser to return any evaporated solvent to the first and second liquid phases.

It is generally desirable to separate the first and second liquid phases by gravity. This is because gravity separation can be conducted in standard reaction vessels, and requires less energy than centrifugation. In order for gravity separation to be feasible, the first and second liquid phases should separate in a reasonable period of time. For example, the first and second liquid phases should separate in less than or equal to 2 hours, specifically less than or equal to 1 hour, more specifically less than or equal to 30 minutes, and still more specifically, less than or equal to 15 minutes. The difference in density between the first and second liquid phases at the separation temperature must be large enough in order to achieve separation times of less than or equal to 2 hours. For example, at 65° C., the difference in density between the first and second liquid phases must be about 20 to about 75 kilograms per cubic meter, specifically about 25 to about 70 kilograms per cubic meter, more specifically about 30 to about 65 kilograms per cubic meter, and still more specifically about 35 to about 60 kilograms per cubic meter.

In some embodiments, the first and second liquid phases can be separated using a liquid-liquid centrifuge. Suitable liquid-liquid centrifuges are described, for example, in U.S. Pat. No. 2,622,797 of Hemfort, U.S. Pat. No. 4,614,598 of Zettier et al., and U.S. Pat. No. 4,755,165 of Gunnewig, and in Great Britain Patent Specification No. 884,768. Suitable liquid-liquid centrifuges are commercially available, for example from GEA-Westfalia Separator AG. Liquid-liquid centrifuges are particularly useful for continuous separation processes. Other suitable separation apparatus includes coalescers, decanters, and the like. Suitable coalescers are described, for example, in U.S. Pat. No. 6,332,987 B1 to Whitney et al., and U.S. Patent Application Publication No. US 2005/0178718 A1 of Geibel et al.

As used herein, the term "washing" is used to signify the combined steps of mixing a poly(phenylene ether) solution comprising a poly(phenylene ether) and an poly(phenylene ether) solvent with first washing solvents comprising a C1-C4 alkanol and water, and separating the first liquid phase from the second liquid phase. No limit is placed on the number of washing steps that can be used. In some embodiments, the poly(phenylene ether) solution comprising a poly(phenylene ether) and an poly(phenylene ether) solvent can be washed multiple times, or until no further reduction in catalyst metal ion content or color is obtained. The first and subsequent washing solvents can be the same or different, as long as the liquid phases formed in each washing step comprise, based on 100 weight percent total of the poly(phenylene ether) solvent, the C1-C4 alcohol, and water, about 60 to about 95 weight percent poly(phenylene ether) solvent, about 4 to about 32 weight percent C1-C4 alkanol, and about 1 to about 36 weight percent water; the first liquid phase and the second liquid phase are present in a volume ratio of about 1.5:1 to about 10:1; and the first liquid phase comprises at least 95 weight percent of the poly(phenylene ether) in solution.

In some embodiments, two washing steps are used. In particular, the separated first liquid phase from the first wash, and the second washing solvents comprising a C1-C4 alkanol and water are mixed to form a second mixture comprising a third liquid phase comprising poly(phenylene ether) and poly(phenylene ether) solvent, and a fourth liquid phase comprising C1-C4 alkanol and water; and the first liquid phase is separated from the second liquid phase; wherein the separated first liquid phase and the second washing solvents are mixed in a volume ratio of 1.5:1 to about 10:1; wherein the second mixture comprises, based on 100 weight percent total of the poly(phenylene ether) solvent, the C1-C4 alcohol, and the water, about 60 to about 95 weight percent poly(phenylene ether) solvent, about 4 to about 32 weight percent C1-C4 alkanol, and about 1 to about 36 weight percent water; and wherein the third liquid phase comprises at least 95 weight percent of the poly(phenylene ether) in solution.

In some embodiments, three washing steps are used. In particular, the separated third liquid phase from the second wash, and the third washing solvents comprising a C1-C4 alkanol and water are mixed to form a third mixture comprising a fifth liquid phase comprising poly(phenylene ether) and poly(phenylene ether) solvent, and a sixth liquid phase comprising C1-C4 alkanol and water; and the fifth liquid phase is separated from the sixth liquid phase; wherein the separated third liquid phase and the third washing solvents are mixed in a volume ratio of 1.5:1 to about 10:1; wherein the third mixture comprises, based on 100 weight percent total of the poly(phenylene ether) solvent, the C1-C4 alcohol, and the water, about 60 to about 95 weight percent poly(phenylene ether) solvent, about 4 to about 32 weight percent C1-C4 alkanol, and about 1 to about 36 weight percent water; and wherein the fifth liquid phase comprises at least 95 weight percent of the poly(phenylene ether) in solution.

The poly(phenylene ether) solvent must be a good solvent for the poly(phenylene ether). The poly(phenylene ether) solvent can be an aromatic hydrocarbon solvent or chloroform. Examples of aromatic hydrocarbon solvents are benzene, toluene, xylenes, mesitylene, chlorobenzene, dichlorobenzenes, and combinations thereof. In some embodiments, the poly(phenylene ether) solvent comprises toluene. The C1-C4 alkanol can be methanol, ethanol, n-propanol, isopropanol, n-butanol, sec-butanol, tert-butanol, ethylene glycol, propylene glycol, 1,4-butanediol, glycerol, or combinations thereof. In some embodiments, the C1-C4 alkanol comprises methanol.

The first washing solvents comprise a C1-C4 alkanol and water. In some embodiments, the C1-C4 alkanol and water are premixed to form a washing solution, which is then mixed with the poly(phenylene ether) solution. In other embodiments, the C1-C4 alkanol and water are mixed sequentially or simultaneously with the poly(phenylene ether) solution. When the washing solvents are mixed sequentially with the poly(phenylene ether) solution, the washing solvents can be mixed in any order. In some embodiments, the washing solvents further comprise poly(phenylene ether) solvent in addition to the C1-C4 alkanol and water. The poly(phenylene ether) solvent can be premixed with the C1-C4 alkanol and water before adding the resulting solvent mixture to the poly(phenylene ether) solution, or it can be mixed with the poly(phenylene ether) solution separately, before or after mixing the C1-C4 alkanol and water with the poly(phenylene ether) solution. The poly(phenylene ether) solvent mixed with the washing solvents can be the same as the poly(phenylene ether) solvent in the poly(phenylene ether) solution, or it can be a different poly(phenylene ether) solvent.

In some embodiments, the poly(phenylene ether) solvent is toluene and the C1-C4 alkanol is methanol. A phase diagram depicting suitable amounts of toluene, methanol, and water for the first and second liquid phases combined is provided in FIG. 1. The lower horizontal line of the triangle is a scale of toluene content from 0 to 100 weight percent and the lower right vertex of the triangle represents 100 weight percent toluene. The right slanting line of the triangle is a scale of methanol content from 0 to 100 weight percent and the top vertex of the triangle represents 100 weight percent methanol. The left slanting line of the triangle is a scale of water content from 0 to 100 weight percent water and the lower left vertex of the triangle represents 100 weight percent water. Each point within the area of the triangle defines a specific mixture of toluene, methanol, and water based on its position relative to the three scales.

The first and second liquid phases combined comprise, based on 100 weight percent total of the poly(phenylene ether) solvent, the C1-C4 alcohol, and the water, about 60 to about 95 weight percent poly(phenylene ether) solvent, about 4 to about 32 weight percent C1-C4 alkanol, and about 1 to about 36 weight percent water. When the poly(phenylene ether) solvent is toluene and the C1-C4 alkanol is methanol, the composition of the first and second liquid phases combined falls within the area identified as 10 in FIG. 1.

In some embodiments, the first and second liquid phases combined comprise, based on 100 weight percent total of the poly(phenylene ether) solvent, the C1-C4 alcohol, and the water, about 60 to about 81 weight percent poly(phenylene ether) solvent, about 4 to about 32 weight percent C1-C4 alkanol, and about 18 to about 36 weight percent water. When the poly(phenylene ether) solvent is toluene and the C1-C4 alkanol is methanol, the compositions of the first and second liquid phases combined of Examples 5 and 6 are identified as points 5 and 6, respectively, in FIG. 1.

In some embodiments, the first and second liquid phases combined comprise, based on 100 weight percent total of the poly(phenylene ether) solvent, the C1-C4 alcohol, and the water, about 67 to about 95 weight percent poly(phenylene ether) solvent, about 25 to about 32 weight percent C1-C4 alkanol, and about 1 to about 18 weight percent water.

In some embodiments, the first and second liquid phases combined comprise, based on 100 weight percent total of the poly(phenylene ether) solvent, the C1-C4 alcohol, and the water, about 60 to about 95 weight percent poly(phenylene ether) solvent, about 4 to about 25 weight percent C1-C4 alkanol, and about 1 to about 18 weight percent water. When the poly(phenylene ether) solvent is toluene and the C1-C4 alkanol is methanol, the compositions of the first and second liquid phases combined of Examples 1-4 are identified as points 1-4, respectively, in FIG. 1.

In the present method, the first liquid phase is enriched in the poly(phenylene ether) solvent so that the first liquid phase comprises at least 95 weight percent of the poly(phenylene ether) in solution. Thus, the first liquid phase comprises, based on 100 weight percent total of the poly(phenylene ether) solvent, the C1-C4 alcohol, and the water in the first liquid phase, about 70 to about 98 weight percent poly(phenylene ether) solvent, about 1 to about 25 weight percent C1-C4 alkanol, and about 1 to about 18 weight percent water.

The method is applicable to poly(phenylene ether) solutions having a wide range of poly(phenylene ether) concentrations. Thus in some embodiments, the poly(phenylene ether) solution comprises about 5 to about 80 weight percent, specifically about 15 to about 60 weight percent, and more specifically about 20 to about 40 weight percent, of the poly(phenylene ether), based on the total weight of the poly(phenylene ether) and the poly(phenylene ether) solvent.

The first washing solvents can comprise solvents other than the C1-C4 alkanol and water. For example, when the poly(phenylene ether) solution is provided as a crude poly(phenylene ether) reaction mixture, it can be desirable to dilute the poly(phenylene ether) solution with poly(phenylene ether) solvent in order to prevent precipitation of the poly(phenylene ether) from solution, to reduce the viscosity of the poly(phenylene ether) solution to facilitate mixing without the application of excessive torque, and to facilitate gravity separation of the first and second liquid phases. Thus in some embodiments, the first washing solvents further comprises a poly(phenylene ether) solvent. The poly(phenylene ether) solvent added to the first washing solvents can be the same or different than the poly(phenylene ether) solvent in the poly(phenylene ether) solution. In some embodiments the poly(phenylene ether) solvent added along with the first washing solvents can be an azeotrope obtained by distillation of waste solvent streams. For example, when the poly(phenylene ether) solvent is toluene and the C1-C4 alkanol is methanol, the poly(phenylene ether) solvent can be an azeotrope comprising about 72 weight percent methanol and about 28 weight percent toluene. The skilled person in the art will appreciate that the more methanol added as the methanol-toluene azeotrope, the less pure methanol needs to be added to achieve a target methanol amount. Whether the first washing solvents comprise a poly(phenylene ether) solvent or not, the first and second liquid phases combined still comprise about 60 to about 95 weight percent poly(phenylene ether) solvent, about 4 to about 32 weight percent C1-C4 alkanol, and about 1 to about 36 weight percent water.

The method is applicable to poly(phenylene ether)s having a wide variety of structures. In some embodiments, the poly(phenylene ether) comprises repeating structural units having the structure

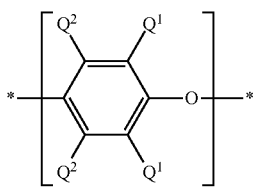

wherein for each structural unit, each $Q^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Q^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or it can contain heteroatoms within the backbone of the hydrocarbyl residue. As one example, $Q^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can be bifunctional poly(phenylene ether), comprising, on average, close to two terminal hydroxyl groups per molecule. In one embodiment, the poly(phenylene ether) comprises a bifunctional poly(phenylene ether) having the structure

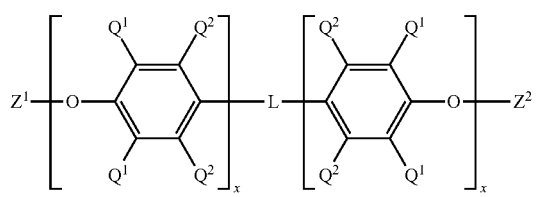

wherein each occurrence of $Q^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$, hydrocarbyloxy, or $C_2$-$C_{12}$ halohydrocarbyloxy wherein at least two carbon atoms separate the halogen and oxygen atoms; each occurrence of x is independently 0 to about 100, provided that the sum of each occurrence of x is at least three; $Z^1$ and $Z^2$ are each independently

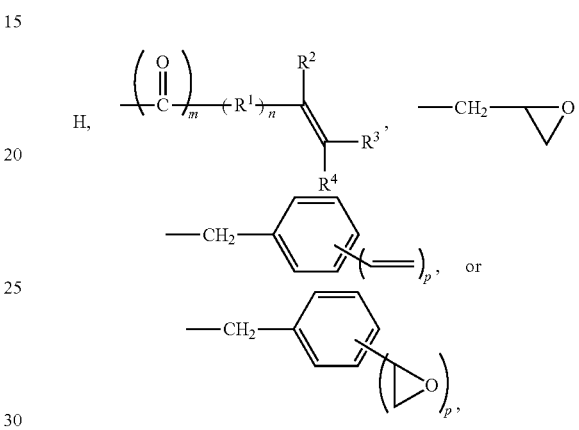

wherein each occurrence of $R^1$ is $C_1$-$C_{12}$ hydrocarbylene; each occurrence of m is independently 0 or 1; each occurrence of n is independently 0 or 1; each occurrence of p is independently 0-3, each occurrence of $R^2$-$R^4$ is independently hydrogen or $C_1$-$C_{18}$ hydrocarbyl; and L has the structure

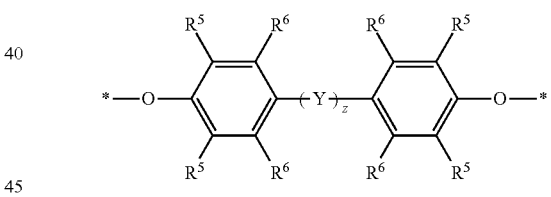

wherein each occurrence of $R^5$ and $R^6$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and Y has the structure

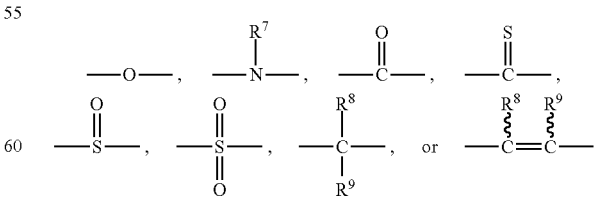

wherein $R^7$, $R^8$, and $R^9$ are each independently hydrogen, or $C_1$-$C_{12}$ hydrocarbyl.

In some embodiments, the poly(phenylene ether) has an intrinsic viscosity of about 0.2 to about 1 deciliter per gram measured at 25° C. in chloroform. Within this range, the poly(phenylene ether) intrinsic viscosity can be about 0.25 to about 0.65 deciliter per gram, more specifically about 0.25 to about 0.5 deciliter per gram, still more specifically about 0.25 to about 0.46 deciliter per gram, and yet more specifically about 0.25 to about 0.35 deciliter per gram.

The poly(phenylene ether)s can be prepared by oxidative polymerization of at least one monohydric phenol, optionally in combination with at least one dihydric or polyhydric phenol, in the presence of a polymerization catalyst comprising a catalyst metal ion and a catalyst amine ligand, oxygen, and poly(phenylene ether) solvent. The polymerization catalyst can be prepared in situ by mixing the catalyst metal ion and the catalyst amine ligand. The poly(phenylene ether) solvent can be benzene, toluene, xylenes, mesitylene, chlorobenzene, dichlorobenzenes, chloroform, or combinations thereof. In some embodiments, the poly(phenylene ether) solvent comprises toluene. The molecular oxygen can be provided, for example, in a purified form or as air.

Catalyst metal ions for the preparation of the poly(phenylene ether) can comprise at least one heavy metal ion such as a copper, manganese or cobalt. Metal salts which can serve as sources of catalyst metal ions include cuprous chloride, cupric chloride, cuprous bromide, cupric bromide, cuprous iodide, cupric iodide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate and cuprous benzoate; and similar manganese salts and cobalt salts. Suitable catalyst amine ligands include dialkylamines (such as di-n-butylamine, or DBA), trialkylamines (such as N,N-dimethylbutylamine, or DMBA), and alkylenediamines (such as N,N'-di-tert-butyl-ethylenediamine, or DBEDA). Instead of direct addition of any of the above-exemplified metal salts, it is also possible to add a metal or a metal oxide and an inorganic acid, organic acid or an aqueous solution of such an acid and form the corresponding metal salt or hydrate in situ.

The poly(phenylene ether) solution can be a crude poly (phenylene ether) reaction mixture comprising poly(phenylene ether), poly(phenylene ether) solvent, water, catalyst metal ion, and catalyst amine ligands in which the poly(phenylene ether) solution has not been treated with aqueous chelating agent to remove the catalyst metal ions. Thus, in some embodiments, prior to mixing with the first washing solvents, the poly(phenylene ether) solution comprises less than or equal to 900 parts per million by weight, specifically less than or equal to 700 parts per million by weight, more specifically less than or equal to 500 parts per million by weight, and still more specifically less than or equal to 300 parts per million by weight, of catalyst metal ion, based on the weight of poly(phenylene ether).

The amount of catalyst metal ion, for example copper ion, in a poly(phenylene ether) can be reduced by extracting a solution of the poly(phenylene ether) in poly(phenylene ether) solvent with an aqueous chelating agent. See, for example, U.S. Pat. No. 3,838,102 to Bennett. Suitable chelating agents include, for example, polyalkylenepolyamine polycarboxylic acids, aminopolycarboxylic acids, aminocarboxylic acids, polycarboxylic acids, alkali metal salts of the foregoing acids, alkaline earth metal salts of the foregoing acids, mixed alkali metal-alkaline earth metal salts of the foregoing acids, and combinations thereof. Examples of specific chelating agents are alkali metal salts of nitrilotriacetic acid, alkali metal salts of ethylenediaminetetraacetic acid, and combinations thereof. A specific example of a chelating agent is trisodium nitrilotriacetate.

The water present in crude poly(phenylene ether) reaction mixtures can be separated prior to mixing with the first washing solvents. The crude poly(phenylene ether) reaction mixture can also be extracted with an aqueous chelating agent in order to reduce the catalyst metal ion content prior to mixing with the first washing solvents. Thus, the method is applicable to poly(phenylene ether) reaction mixtures that have been pre-treated with aqueous chelating agent to remove catalyst metal ions, and to other poly(phenylene ether) solutions comprising relatively low concentrations of catalyst metal ion. For example, the method is applicable to poly(phenylene ether) solutions prepared from solid poly(phenylene ether) that has already been isolated from crude poly(phenylene ether) reaction mixtures. This can be desirable, for example, when further reduction in the level of catalyst metal ion in the solid poly(phenylene ether) is desired, or the color of the solid poly(phenylene ether) is unacceptable. Thus, in some embodiments, prior to mixing with the first washing solvents, the concentration of catalyst metal ion in the poly(phenylene ether) solution can be less than or equal to 100 parts per million by weight, specifically less than or equal to 50 parts per million by weight, more specifically less than or equal to 30 parts per million by weight, and still more specifically less than or equal to 10 parts per million by weight, based on the weight of the poly(phenylene ether).

The method is effective in reducing the amount of catalyst metal ion to levels comparable to those obtained by the methanol-precipitation method. However further reductions in catalyst metal ion amounts can be achieved by addition of a chelating agent to any one or combination of first and subsequent washing solvents. The chelating agent can be dissolved in the first washing solvents in a ratio of moles of chelating agent to moles of catalyst metal ion of about 1:1 to about 10:1, specifically about 1:1 to about 7:1, and more specifically about 1:1 to about 4:1. Thus, in some embodiments, the poly(phenylene ether) solution further comprises a catalyst metal ion, and a chelating agent is dissolved in the first washing solvents, wherein the first and second liquid phases combined comprise a ratio of moles of chelating agent to moles of catalyst metal ion of about 1:1 to about 10:1.

In some embodiments, a chelating agent is not added to the washing solvents. In particular, in some embodiments, less than 10 parts per million, specifically less than 5 parts per million, and more specifically less than 1 part per million, by weight of a chelating agent, based on the total weight of the first washing solvents, is dissolved in the first washing solvents. In some embodiments, no chelating agent is dissolved in the first washing solvents.

In some embodiments, for example where the intended use of the poly(phenylene ether) is for compounding with other thermoplastics and additives, and for molding, shaping, or forming the poly(phenylene ether) into an article, it can be desirable to isolate the poly(phenylene ether) in solid form from the first or subsequent liquid phases comprising the poly(phenylene ether) and poly(phenylene ether) solvent. Thus in some embodiments, the method further comprises isolating the poly(phenylene ether) from the separated first liquid phase. There are several methods for isolating solid poly(phenylene ether) form poly(phenylene ether) solutions. One method comprises precipitation with an antisolvent. However this method suffers from the high capital costs of solids handling equipment, the relatively high cost for the processing of solid poly(phenylene ether) in terms of energy and cycle time, the large volumes of antisolvent that are required, and the energy required for recovery of the antisolvent by distillation. As an alternative to the antisolvent precipitation method, the poly(phenylene ether) can be isolated by evaporative removal of the poly(phenylene ether) from the first liquid phase. Thus in some embodiments, the method further comprises isolating the poly(phenylene ether) from the separated first liquid phase by devolatilizing extrusion, devolatizing on a thin film evaporator, low temperature vacuum devolatilization, spray drying, steam precipitation, crumb formation with hot water, and combinations thereof.

The method provides poly(phenylene ether) of high purity. In particular, the method is effective in reducing catalyst metal ion and colored impurity content. In some embodiments, the method provides poly(phenylene ether) having less than or equal to 100 parts per million by weight, specifically less than or equal to 50 parts per million by weight, more specifically, less than or equal to 10 parts per million by weight, and still more specifically, less than or equal to 2 parts per million by weight, based on the weight of the poly(phenylene ether), of catalyst metal ion. In some embodiments, the method provides poly(phenylene ether) having a yellowness index of less than or equal to 30, specifically less than or equal to 26, more specifically less than or equal to 24, and still more specifically, less than or equal to 22, as measured in accordance with ASTM E 313-00 and D 1925-70.

The invention includes at least the following embodiments.

Embodiment 1

A method of purifying a poly(phenylene ether), comprising: mixing a poly(phenylene ether) solution comprising a poly(phenylene ether) and a poly(phenylene ether) solvent selected from the group consisting of toluene, xylenes, mesitylene, chlorobenzene, dichlorobenzenes, chloroform, and combinations thereof, and first washing solvents comprising a C1-C4 alkanol and water to form a first liquid phase comprising poly(phenylene ether) and poly(phenylene ether) solvent, and a second liquid phase comprising C1-C4 alkanol and water; and separating the first liquid phase from the second liquid phase; wherein the first liquid phase and the second liquid phase are present in a volume ratio of about 1.5:1 to about 10:1; wherein the first and second liquid phases combined comprise, based on 100 weight percent total of the poly(phenylene ether) solvent, the C1-C4 alcohol, and the water, about 60 to about 95 weight percent poly(phenylene ether) solvent, about 4 to about 32 weight percent C1-C4 alkanol, and about 1 to about 36 weight percent water; and wherein the first liquid phase comprises at least 95 weight percent of the poly(phenylene ether) in solution.

Embodiment 2

The method of embodiment 1, wherein the total amount of C1-C4 alkanol and water in the first and second liquid phases combined is at least 10 weight percent, based on 100 weight percent total of the poly(phenylene ether) solvent, the C1-C4 alkanol, and the water.

Embodiment 3

The method of embodiment 1 or 2, wherein the first and second liquid phases combined comprise, based on 100 weight percent total of the poly(phenylene ether) solvent, the C1-C4 alcohol, and the water, about 60 to about 81 weight percent poly(phenylene ether) solvent, about 4 to about 32 weight percent C1-C4 alkanol, and about 18 to about 36 weight percent water.

Embodiment 4

The method of any of embodiments 1-3, wherein the first and second liquid phases combined comprise, based on 100 weight percent total of the poly(phenylene ether) solvent, the C1-C4 alcohol, and the water, about 67 to about 95 weight percent poly(phenylene ether) solvent, about 25 to about 32 weight percent C1-C4 alkanol, and about 1 to about 18 weight percent water.

Embodiment 5

The method of any of embodiments 1-4, wherein the first and second liquid phases combined comprise, based on 100 weight percent total of the poly(phenylene ether) solvent, the C1-C4 alcohol, and the water, about 60 to about 95 weight percent poly(phenylene ether) solvent, about 4 to about 25 weight percent C1-C4 alkanol, and about 1 to about 18 weight percent water.

Embodiment 6

The method of any of embodiments 1-5, wherein the first liquid phase comprises, based on 100 weight percent total of the poly(phenylene ether) solvent, the C1-C4 alcohol, and the water, in the first liquid phase, about 70 to about 98 weight percent poly(phenylene ether) solvent, about 1 to about 25 weight percent C1-C4 alkanol, and about 1 to about 18 weight percent water.

Embodiment 7

The method of any of embodiments 1-6, wherein the poly (phenylene ether) comprises a bifunctional poly(phenylene ether) having the structure

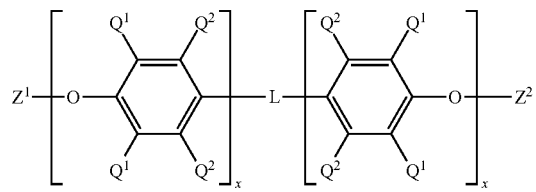

wherein each occurrence of $Q^1$ is independently halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$, hydrocarbyloxy, or $C_2$-$C_{12}$ halohydrocarbyloxy wherein at least two carbon atoms separate the halogen and oxygen atoms; each occurrence of $Q^2$ is independently hydrogen, halogen, unsubstituted or substituted $C_1$-$C_{12}$ hydrocarbyl with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of x is independently 0 to about 100, provided that the sum of each occurrence of x is at least three; $Z^1$ and $Z^2$ are each independently

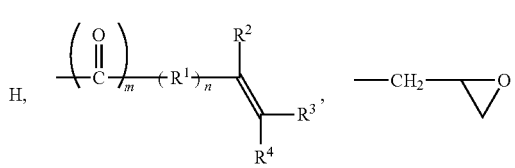

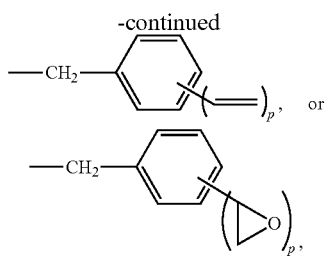

wherein each occurrence of $R^1$ is $C_1$-$C_{12}$ hydrocarbylene; each occurrence of m is independently 0 or 1; each occurrence of n is independently 0 or 1; each occurrence of p is independently 0-3, each occurrence of $R^2$-$R^4$ is independently hydrogen or $C_1$-$C_{18}$ hydrocarbyl; and L has the structure

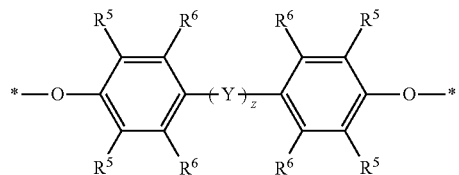

wherein each occurrence of $R^5$ and $R^6$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and Y has the structure

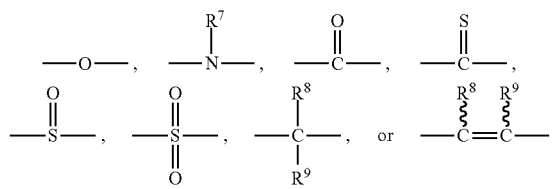

wherein $R^7$, $R^8$, and $R^9$ are each independently hydrogen, or $C_1$-$C_{12}$ hydrocarbyl.

Embodiment 8

The method of any of embodiments 1-7, wherein the poly(phenylene ether) solution comprises about 5 to about 80 weight percent poly(phenylene ether), based on the total weight of the poly(phenylene ether) and the poly(phenylene ether) solvent in the poly(phenylene ether) solution.

Embodiment 9

The method of any of embodiments 1-8, wherein the first washing solvents further comprise poly(phenylene ether) solvent.

Embodiment 10

The method of any of embodiments 1-9, wherein the poly(phenylene ether) solvent is selected from the group consisting of toluene, xylenes, mesitylene, chlorobenzene, dichlorobenzenes, and combinations thereof.

Embodiment 11

The method of any of embodiments 1-10, wherein the poly(phenylene ether) solvent comprises toluene.

Embodiment 12

The method of any of embodiments 1-11, wherein the C1-C4 alkanol comprises methanol.

Embodiment 13

The method of any of embodiments 1-12, wherein the poly(phenylene ether) solution further comprises a catalyst metal ion; a chelating agent is dissolved in the first washing solvents; and wherein the first and second liquid phases combined comprise a ratio of moles of chelating agent to moles of catalyst metal ion of about 1:1 to about 10:1.

Embodiment 14

The method of embodiment 13, wherein the chelating agent is selected from the group consisting of polyalkylenepolyamine polycarboxylic acids, aminopolycarboxylic acids, aminocarboxylic acids, polycarboxylic acids, alkali metal salts of the foregoing acids, alkaline earth metal salts of the foregoing acids, mixed alkali metal-alkaline earth metal salts of the foregoing acids, and combinations thereof.

Embodiment 15

The method of any of embodiments 1-12, wherein less than 10 parts per million by weight of a chelating agent, based on the total weight of the first washing solvents, is dissolved in the first washing solvents.

Embodiment 16

The method of any of embodiments 1-15, wherein the poly(phenylene ether) solution further comprises less than or equal to 900 parts per million by weight of catalyst metal ion, based on the weight of poly(phenylene ether).

Embodiment 17. The method of any of embodiments 1-16, wherein the poly(phenylene ether) solution further comprises less than or equal to 100 parts per million by weight of catalyst metal ion, based on the weight of poly(phenylene ether).

Embodiment 18

The method of any of embodiments 1-17, wherein the first liquid phase is more dense than the second liquid phase.

Embodiment 19

The method of any of embodiments 1-18, wherein the separating comprises separating by gravity.

Embodiment 20

The method of any of embodiments 1-19, further comprising: mixing the separated first liquid phase and second washing solvents comprising a C1-C4 alkanol and water to form a third liquid phase comprising poly(phenylene ether) and poly(phenylene ether) solvent, and a fourth liquid phase comprising C1-C4 alkanol and water; and separating the third liquid phase from the fourth liquid phase; wherein the separated first liquid phase and the second washing solvents are mixed in a volume ratio of about 1.5:1 to about 10:1; wherein the third and fourth liquid phases combined comprise, based on 100 weight percent total of the poly(phenylene ether) solvent, the C1-C4 alcohol, and the water, about 60 to about 95 weight percent poly(phenylene ether) solvent, about 4 to about 32 weight percent C1-C4 alkanol, and about 1 to about 36 weight percent water; and wherein the third liquid phase comprises at least 95 weight percent of the poly(phenylene ether) in solution.

Embodiment 21

The method of embodiment 20, further comprising: mixing the separated third liquid phase and third washing solvents comprising a C1-C4 alkanol and water to form a fifth liquid phase comprising poly(phenylene ether) and poly(phenylene ether) solvent, and a sixth liquid phase comprising C1-C4 alkanol and water; and separating the fifth liquid phase from the sixth liquid phase; wherein the separated third liquid phase and the third washing solvents are mixed in a volume ratio of about 1.5:1 to about 10:1; wherein the fifth and sixth liquid phases combined comprise, based on 100 weight percent total of the poly(phenylene ether) solvent, the C1-C4 alcohol, and the water, about 60 to about 95 weight percent aromatic hydrocarbon solvent, about 4 to about 32 weight percent C1-C4 alkanol, and about 1 to about 36 weight percent water; and wherein the fifth liquid phase comprises at least 95 weight percent of the poly(phenylene ether) in solution.

Embodiment 22

The method of any of embodiments 1-21, further comprising isolating the poly(phenylene ether) from the separated first liquid phase.

Embodiment 23

The method of any of embodiments 22, wherein the isolating comprises using an isolation method selected from the group consisting of devolatilizing extrusion, devolatizing on a thin film evaporator, low temperature vacuum devolatilization, spray drying, steam precipitation, crumb formation with hot water, and combinations thereof.

Embodiment 24

The method of any of embodiments 22-23, wherein the poly(phenylene ether) isolated from the separated first liquid phase has less than or equal to 100 parts by million by weight of catalyst metal ion.

Embodiment 25

The method of any of embodiments 22-24, wherein the poly(phenylene ether) isolated from the separated first liquid phase has a yellowness index of less than or equal to 30, as measured in accordance with ASTM E 313-00 and D 1925-70.

Embodiment 26

A method of purifying a poly(phenylene ether), comprising: mixing a poly(phenylene ether) solution comprising a poly(phenylene ether) and toluene, and first washing solvents comprising methanol and water to form a first liquid phase comprising poly(phenylene ether) and toluene, and a second liquid phase comprising methanol and water; and separating the first liquid phase from the second liquid phase; wherein the poly(phenylene ether) solution and the first washing solvents are mixed in a volume ratio of about 2:1 to about 7:1; wherein the first and second liquid phases combined comprise, based on 100 weight percent total of the toluene, the methanol, and the water, about 60 to about 90 weight percent toluene, about 9 to about 25 weight percent methanol, and about 1 to about 10 weight percent water; and wherein the first liquid phase comprises at least 95 weight percent of the poly(phenylene ether) in solution.

Embodiment 26a

The method of embodiment 1, comprising: mixing a poly(phenylene ether) solution comprising a poly(phenylene ether) and toluene, and first washing solvents comprising methanol and water to form a first liquid phase comprising poly(phenylene ether) and toluene, and a second liquid phase comprising methanol and water; and separating the first liquid phase from the second liquid phase; wherein the poly(phenylene ether) solution and the first washing solvents are mixed in a volume ratio of about 2:1 to about 7:1; wherein the first and second liquid phases combined comprise, based on 100 weight percent total of the toluene, the methanol, and the water, about 60 to about 90 weight percent toluene, about 9 to about 25 weight percent methanol, and about 1 to about 10 weight percent water; and wherein the first liquid phase comprises at least 95 weight percent of the poly(phenylene ether) in solution.

The invention is further illustrated by the following non-limiting examples.

EXAMPLES

Toluene, methanol, and water contents were analyzed using a gas chromatograph (Agilent 6890). The odor-causing components, herein referred to as "odorous impurities", and the toluene content, in isolated poly(2,6 dimethyl-1,4-phenylene ether) were measured using a gas chromatograph (Agilent 6850) equipped with an HP 1 column having a length of 30 meters, an inner diameter of 0.32 millimeter, and a film thickness of 0.25 micrometer. The copper content was measured by Atomic Absorption using an Arian-55B Atomic Absorption spectrometer and a Milestone Ethros for microwaving the samples. The concentrations of di-n-butylamine (DBA) and N,N-dimethylbutylamine (DMBA) were measured by proton nuclear magnetic resonance ($^1$H NMR) spectroscopy at 400 megahertz with a Varian Mercury Plus NMR spectrometer. The limit of detection for the NMR measurements was 0.05 weight percent. Yellowness index (YI) was measured using a Greytag MacBeth Color-eye 7000A spectrophotometer in accordance with ASTM E 313-00 and D 1925-70.

The apparatus used in the working examples was a 1,000 milliliter cylindrical glass reaction vessel with an outlet at the bottom having a stopcock. The top was covered with a 4-neck reaction lid, and the vessel was equipped with an agitator, reflux system, thermocouple, and a port for material charging and sampling. The thermocouple was connected to a J-Chem temperature control unit that powered a heating jacket surrounding the reaction vessel.

Comparative Example 1

Methanol Precipitation

A solution of poly(2,6-dimethyl-1,4-phenylene ether) in toluene of about 20 weight percent was obtained by oxidative polymerization of 2,6-dimethylphenol in toluene in the presence of a copper ion catalyst and catalyst amine ligand ligands comprising di-n-butylamine (DBA) and N,N-dimethylbutylamine (DMBA). The solution was mixed with a quantity of a 10 weight percent trisodium nitrilotriacetate solution in water to provide a mole ratio of chelating agent to copper ion of between 1.2:1 and 1.8:1. The resulting poly(2,6-dimethyl-1,4-phenylene ether) solution was separated from the aqueous trisodium nitrilotriacetate solution. Methanol (1175 grams) was added to 500 grams of the separated poly(2,6 dimethyl-1,4-phenylene ether) solution, which resulted in precipitation of the poly(2,6-dimethyl-1,4-phenylene ether). The solvent composition for this step, expressed as mass fraction (weight percent), is depicted graphically as point 9 in FIG. 1. The poly(2,6-dimethyl-1,4-phenylene ether) which precipitated was filtered, reslurried with 1175 grams of methanol, and filtered again. The reslurry and filtration steps were repeated. The resulting poly(2,6-dimethyl-1,4-phenylene ether) filter cake was dried at 125° C. and 510 millimeters of mercury. The copper content of the dried poly(2,6-dimethyl-1,4-phenylene ether) powder was 0.5 parts per million by weight.

Examples 1-6

Toluene, in the amounts specified in Table 1, was added to the reaction vessel and heated to 65.6° C. (150° F.). Solutions of the specified amounts of poly(2,6-dimethyl-1,4-phenylene ether) (PPE) in the toluene (16.7 weight percent PPE) were prepared by gradual addition of poly(2,6-dimethyl-1,4-phenylene ether) powder to the toluene with constant agitation at 500 revolutions per minute to ensure that homogenous solutions were formed without any lumps of congealed poly(2,6-dimethyl-1,4-phenylene ether). The amounts of methanol and water specified in Table 1 were added. The resulting methanol-water mixtures were preheated to 150° F., and then added to the 16.7 weight percent poly(2,6-dimethyl-1,4-phenylene ether) solutions. The resulting mixtures of PPE, toluene, methanol and water were agitated at a constant speed of 450 revolutions per minute for 15 minutes, and then allowed to settle. The quantities of methanol and water were such that the final mixture separated into two distinct liquid phases. In Examples 1-4, there was no detectable precipitate in the liquid phases. However a small amount of solid poly(2,6-dimethyl-1,4-phenylene ether) was formed in Examples 5 and 6. The amount of solid poly(2,6-dimethyl-1,4-phenylene ether) in Examples 5 and 6 was estimated to be less than 5 weight percent of the total amount of poly(2,6-dimethyl-1,4-phenylene ether). The volumes of the methanol-rich top phase and toluene-rich bottom phase to the nearest 5 milliliters were noted at fixed time intervals until the phases had separated. The time intervals were 1 minute when the settling time was less than 20 minutes (Examples 1, 3, and 5) and 5 minutes when the settling time was greater than 20 minutes (Examples 2 and 6). Settling time is defined herein as the time when the volumes of the two phases, to the nearest 5 milliliters, does not change any further. The top phases and the bottom phases were sampled and analyzed for toluene, methanol, and water content. About 20 milliliters of both phases were allowed to dry under a nitrogen purge overnight and then further dried for 4 hours in a vacuum oven at 125° C. and 510 millimeters of mercury to determine the solids content. The weights and weight percents of toluene, methanol, and water present in the initial mixture, the volumes and compositions in mole percent of the first and second liquid phases, and settling times are provided in Table. 1.

TABLE 1

Phase Composition and Settling Times for Examples 1-6.

| | | Solvent Amounts - PPE-free Basis | | Top phase (mol %)[b] | Bottom phase (mol %)[b] | Volume (mL) | | Settling time (min) |
|---|---|---|---|---|---|---|---|---|
| Ex. | Components | Amt. (g) | Amt. (wt %)[a] | Amt. (mol %)[b] | | | Top phase | Bottom phase | |
| 1 | Toluene | 400 | 80.8 | 56.06 | 9.02 | 84.80 | 100 | 550 | 12 |
|   | Methanol | 80 | 16.2 | 32.95 | 64.19 | 15.01 | | | |
|   | Water | 15 | 3.0 | 10.99 | 26.79 | 0.19 | | | |
|   | PPE | 80 | | | | | | | |
| 2 | Toluene | 400 | 76.9 | 47.39 | 1.81 | 88.12 | 110 | 590 | 115 |
|   | Methanol | 80 | 15.4 | 27.85 | 53.25 | 11.88 | | | |
|   | Water | 40 | 7.7 | 24.77 | 44.94 | 0.00 | | | |
|   | PPE | 80 | | | | | | | |
| 3 | Toluene | 400 | 66.7 | 52.80 | 3.94 | 85.05 | 270 | 555 | 14 |
|   | Methanol | 160 | 26.7 | 32.67 | 60.63 | 14.95 | | | |
|   | Water | 40 | 6.7 | 14.53 | 35.43 | 0.00 | | | |
|   | PPE | 80 | | | | | | | |
| 4 | Toluene | 400 | 72.7 | 42.69 | 5.83 | 82.35 | 175 | 540 | 12 |
|   | Methanol | 120 | 21.8 | 39.67 | 63.15 | 17.65 | | | |
|   | Water | 30 | 5.5 | 17.64 | 31.02 | 0.00 | | | |
|   | PPE | 80 | | | | | | | |
| 5 | Toluene | 360 | 60.0 | 26.87 | 92.65 | 0.53 | 490 | 215 | >12 hr |
|   | Methanol | 120 | 20.0 | 26.32 | 7.35 | 35.94 | | | |
|   | Water | 120 | 20.0 | 46.82 | 0.00 | 63.53 | | | |
|   | PPE | 72 | | | | | | | |
| 6 | Toluene | 420 | 70.0 | 34.33 | 92.91 | 0.26 | 600 | 170 | 120 |
|   | Methanol | 60 | 10.0 | 14.41 | 7.09 | 28.58 | | | |
|   | Water | 120 | 20.0 | 51.27 | 0.00 | 71.16 | | | |
|   | PPE | 84 | | | | | | | |

[a]Amt. based on total weight of toluene, methanol, and water.
[b]Amt. based on total moles of toluene, methanol, and water.

The solvent compositions, expressed as mass fraction (weight percent), of Examples 1-6 are depicted graphically in the phase diagram of FIG. 1 as points 1 to 6, respectively. In Examples 1-4, the methanol-rich phase is the top phase. In Examples 5-6, on the other hand, the toluene-rich phase is the top phase. This is due to the relatively high water contents of the methanol-rich layers—63.5 mole percent for Example 5 and 71.1 mole percent for Example 6. It can be seen from Examples 1-4 and Comparative Examples 2-3 that the settling times for initial mixtures with lower methanol content were longer. This is due in part to the increased density of the methanol-rich phase at lower methanol contents, and the resulting reduced density difference between the methanol-rich and toluene-rich phases. Increasing the water content of the toluene-methanol-water mixture also contributes to longer settling times. Examples 2, 5, and 6, with water contents of 24.8, 46.8, and 51.3 weight percent, respectively, and 44.9, 63.5, and 71.1 mole percent water in the methanol-rich phase, respectively, had settling times of 115 minutes, greater than 12 hours, and 120 minutes, respectively. In Examples 5 and 6, the high water content of the initial mixture resulted in the methanol-rich phase becoming more dense than the toluene-rich phase. Although the settling times for Examples 2, 5, and 6 are higher than for Examples 1, 3, and 4, separation of the phases can be accelerated by centrifugation.

Examples 7 and 8

Definition of Phase Separation Boundary

In Example 7, a mixture containing 70 mole percent methanol and 30 mole percent toluene, based on 100 mole percent methanol and toluene, and poly(2,6-dimethyl-1,4-phenylene ether) (20 weight percent based on toluene plus poly(2,6-dimethyl-1,4-phenylene ether) content) was heated to 65.6° C. (150° F.). Water was added in 0.5 milliliter increments. After each incremental addition of water, the mixture was mixed, and allowed to settle. Water was added until two distinct layers were formed. The amount of water added when phase separation was first observed determined the location of point 7 on the parabolic curve on the phase diagram of FIG. 1. In Example 8, a mixture containing 50 mole percent methanol and 50 mole percent toluene, based on 100 mole percent methanol and toluene, and poly(2,6-dimethyl-1,4-phenylene ether) (20 weight percent based on toluene plus poly(2,6-dimethyl-1,4-phenylene ether) content) was heated to 65.6° C. (150° F.). As in Example 7, water was added until two distinct layers were formed. The amount of water added when phase separation was first observed determined the location of point 8 on the parabolic curve on the phase diagram of FIG. 1. Thus the parabolic curve of FIG. 1, which is extrapolated from point 7 (Example 7) and point 8 (Example 8), defines the boundary between homogeneous mixtures of toluene, methanol, water, and poly(2,6-dimethyl-1,4-phenylene ether) and two-phase mixtures of toluene, methanol, water, and poly(2,6-dimethyl-1,4-phenylene ether). Above the parabolic curve, a homogeneous mixture is obtained. Below the parabolic curve, a two-phase mixture is obtained.

Examples 9 and 10

Effect of Agitation Speed on Settling Time

Toluene, in the amounts specified in Table 3, was added to the reaction vessel and heated to 65.6° C. (150° F.). Twenty weight percent solutions of poly(2,6-dimethyl-1,4-phenylene ether) in the toluene was prepared by gradual addition of poly(2,6-dimethyl-1,4-phenylene ether) powder to the toluene with constant agitation at 500 revolutions per minute to ensure a homogenous solution was formed without any lumps of congealed poly(phenylene ether). The amounts of methanol and water specified in Table 3 were mixed, preheated to 150° F., and then added to the 20 weight percent poly(2,6-dimethyl-1,4-phenylene ether) solutions. The resulting mixtures of toluene, methanol, water, and poly(2,6-dimethyl-1,4-phenylene ether) were mixed at varying shear rates by varying the agitator rotation speed. Settling time required for the phases to separate as defined for Examples 1-6 was noted. The results, which are summarized in Table 2, indicate that higher agitation intensity results in longer settling times. When the agitation speed is 500 rpm, the settling time is 17 minutes for Example 10 versus 140 minutes for Example 9. Because of the higher methanol and lower water contents of Example 10, the methanol-rich phase of Example 10 is less dense than the methanol-rich phase of Example 9. With a lower density for the methanol-rich phase, the difference in density between the methanol-rich and toluene-rich phases of Example 10 is greater, which results in the lower settling times observed.

TABLE 3

Phase Composition and Settling Time as a Function of Agitation Speed

| Example | Components | Amt. (g) | Initial mixture (wt %)[a] | Initial mixture (mole %)[b] | Agitation Speed (rpm) | Settling Time (min) |
|---|---|---|---|---|---|---|
| 9 | Toluene | 431.1 | 78.2 | 49.8 | 150 | 6 |
|   | Methanol | 80.0 | 14.5 | 26.6 | 250 | 40 |
|   | Water | 40.0 | 7.3 | 23.6 | 500 | 140 |
|   | PPE | 100.0 | | | | |
| 10 | Toluene | 462.2 | 69.8 | 41.0 | 500 | 17 |
|   | Methanol | 160.0 | 24.2 | 40.8 | 600 | 135 |
|   | Water | 40.0 | 6.0 | 18.2 | | |
|   | PPE | 100.0 | | | | |

[a]Based on total weight of toluene, methanol, and water.
[b]Based on total moles of toluene, methanol, and water.

Examples 11-24 and Comparative Examples 2-3

The following procedure was used in Examples 11-24 and Comparative Examples 2-3. A solution of poly(2,6-dimethyl-1,4-phenylene ether) in toluene of about 20 weight percent was obtained by oxidative polymerization of 2,6-dimethylphenol in toluene in the presence of a copper ion catalyst and catalyst amine ligand ligands comprising di-n-butylamine (DBA) and N, N-dimethylbutylamine (DMBA). The solution was mixed with a quantity of 10 weight percent solution of trisodium nitrilotriacetate to provide a mole ratio of trisodium nitrilotriacetate to copper ion of between 1.2:1 and 1.8:1. The resulting poly(2,6-dimethyl-1,4-phenylene ether) solution was separated from the aqueous chelating agent solution, and is denoted as "Crude PPE solution in toluene" in Tables 4 and 5. "Crude" as used herein, refers to PPE before purification by mixing with methanol and water. For Examples 23 and 24, crude poly(2,6-dimethyl-1,4-phenylene ether) solution before removal of the aqueous chelating agent solution was used.

The crude poly(2,6-dimethyl-1,4-phenylene ether) solution was added to the reaction vessel and heated to 65.6° C. (150° F.). A mixture of 80 grams methanol, 31.1 grams toluene (72:28 weight ratio of methanol to toluene), and 20 grams water (25 weight percent based on the methanol amount) was preheated to 65.6° C. (150° F.) and added to the poly(2,6-dimethyl-1,4-phenylene ether) solution. The resulting mixture was agitated at constant speed. The agitator was then stopped, and the mixture was allowed to split into two distinct liquid phases. The volume of the top methanol-rich phase was noted at 1-minute intervals. The settling time was defined as the time when the volume of the methanol-rich phase did not change any further. The top and bottom phases were sampled and analyzed for their toluene, methanol, and water content using gas chromatography. DBA and DMBA contents were determined using $^1$H NMR spectroscopy. For copper analyses, about 20 milliliters of the crude poly(2,6-dimethyl-1,4-phenylene ether) solution and the top and bottom phases were allowed to dry overnight and were then heated at 125° C. for 4 hours in a vacuum oven at 510 millimeters of mercury. The dried samples were analyzed for copper using Atomic Absorbance. Copper contents of dried samples of the crude poly(2,6-dimethyl-1,4-phenylene ether), are denoted as "dried crude PPE-Cu (ppm)" in Tables 4 and 5. Copper contents based of dried samples of poly(2,6-dimethyl-1,4-phenylene ether) after washing, are denoted as "Dried Bottom phase Cu (ppm)" in Tables 4 and 5.

Table 4 shows the effects of temperature (56.4 to 66.1° C. (133.5 to 151° F.), Examples 11 and 12), agitation time (5, 10, and 15 minutes, Examples 13-15), and agitation speed (250, 350, and 450 revolutions per minute, Examples 16-18) on settling time, copper ion removal, and DBA and DMBA removal. Table 5 shows the effect of added sodium hydroxide (Examples 19 and 20), water wash (no added toluene or methanol, Comparative Examples 2 and 3), and two-stage washing (Examples 21 and 22). In Examples 19-22, the bottom phase was the toluene-rich phase, while in Comparative Examples 2 and 3, the bottom phase was the water-rich phase. Table 6 shows the effect of three-stage washing (Examples 23 and 24) and added acid (Example 24).

TABLE 4

Phase Compositions and Effect of Temperature, Agitation Time, and Agitation Speed on Settling Time

| | Effect of Temperature | | Effect of Agitation Time | | | Effect of Agitation Speed | | |
|---|---|---|---|---|---|---|---|---|
| | | | Example | | | | | |
| Components | 11 | 12 | 13 | 14 | 15 | 16 | 17 | 18 |
| Crude PPE solution in toluene (g) | 470 | 470 | 400 | 400 | 400 | 480 | 480 | 480 |
| Methanol (g) | 80 | 80 | 66.8 | 66.8 | 66.8 | 80 | 80 | 80 |
| Toluene (g) | 31.1 | 31.1 | 26.0 | 26.0 | 26.0 | 31.1 | 31.1 | 31.1 |
| Water (g) | 20 | 20 | 16.7 | 16.7 | 16.7 | 20 | 20 | 20 |
| Wash Parameters | | | | | | | | |
| Agitation speed (rpm) | 450 | 450 | 450 | 450 | 450 | 450 | 350 | 250 |
| Agitation time (min) | 15 | 15 | 5 | 10 | 15 | 7 | 7 | 7 |
| Temperature (° C./° F.) | 56.4/ 133.5 | 66.1/ 151 | 64.4/ 148 | 65.8/ 150.5 | 63.6/ 146.5 | 67.8/ 154.1 | 65.2/ 149.3 | 65.1/ 149.1 |
| Settling time (min) | 10 | 6 | 7 | 6 | 8 | 15 | 11 | 3 |
| Phase Amount & Density | | | | | | | | |
| Bottom - Amount (g) | 535.8 | 536.0 | 447.7 | 447.6 | 447.3 | 537.0 | 535.6 | 535.9 |
| Top - Amount (g) | 84.2 | 80.2 | 66.0 | 67.6 | 67.6 | 88.8 | 86.2 | 86.1 |
| Bottom - Density (kg/m$^3$) | 893 | 893 | 895 | 895 | 895 | 895 | 896 | 896 |
| Top - Density (kg/m$^3$) | 842 | 844 | 845 | 845 | 844 | 846 | 845 | 844 |
| Copper Analysis | | | | | | | | |
| Dried crude PPE - Cu (ppm) | 43.5 | 43.5 | 39 | 39 | 39 | 29 | 29 | 29 |
| Dried Bottom phase - Cu (ppm) | 1.5 | 3 | 4.5 | 4.5 | 4.5 | 0.5 | 1.5 | 2 |
| Percent of Amine In Bottom Phase | | | | | | | | |
| DBA | 100 | 100 | 98.5 | 97.9 | 98.6 | —$^a$ | —$^a$ | —$^a$ |
| DMBA | 91.9 | 93.4 | 93.2 | 93.1 | 92.8 | 91.7 | 91.9 | 91.5 |

$^a$DBA content was less than 0.05 weight percent in the bottom phase.

TABLE 5

Phase Composition and Effect of Sodium Hydroxide, Water Wash, and Two Stage Washing on Copper and DMBA Removal.

| | NaOH Wash | | Water Wash | | Two Stage Wash | | | |
|---|---|---|---|---|---|---|---|---|
| | | | | | Example | | | |
| | | | C. | C. | 21 | | 22 | |
| Components | 19 | 20 | Ex. 2 | Ex. 3 | Stage 1 | Stage 2 | Stage 1 | Stage 2 |
| Crude PPE solution in toluene (g) | 480 | 480 | 480 | 480 | 480 | Stage 1 Bottom | 480 | Stage 1 Bottom |
| Methanol (g) | 80 | 80 | 0 | 0 | 80 | 80 | 80 | 80 |
| Toluene (g) | 31.1 | 31.1 | 0 | 0 | 31.1 | 31.1 | 31.1 | 31.1 |
| Water (g) | 20 | 20 | 100 | 131.1 | 20 | 20 | 20 | 20 |
| 10.7N NaOH (mL) | 2 | 1.5 | — | — | — | — | — | — |
| Wash Parameters | | | | | | | | |
| Agitation speed (rpm) | 450 | 450 | 450 | 450 | 450 | 450 | 450 | 450 |
| Agitation time (min) | 15 | 15 | 15 | 15 | 15 | 15 | 15 | 15 |
| Temperature (° C./° F.) | 64.9/ 148.9 | 66.1/ 150.9 | 67.2/ 153 | 66.4/ 151.5 | 65.6/ 150 | 65.6/ 150 | 66.1/ 150.9 | 65.9/ 150.7 |
| Settling time (min) | 35 | 35 | >12 hr | >12 hr | 16 | 6 | 10 | 7 |
| Phase Amt. & Density | | | | | | | | |
| B - Amount (g) | 537.9 | 541.2 | 90.0 | 131.0 | 538.9 | 502.9 | 536.5 | 522.4 |
| T - Amount (g) | 83.2 | 83.0 | 497.0 | 499.4 | 80.3 | 130.1 | 86.2 | 134.3 |
| B - Density (kg/m$^3$) | 896 | 895 | 1000 | 1000 | 891 | 890 | 894 | 893 |
| T - Density (kg/m$^3$) | 849 | 830 | 903 | 901 | 845 | 839 | 845 | 839 |
| Copper Analysis | | | | | | | | |
| Dried crude PPE - Cu (ppm) | 30 | 33 | 30 | 15.5 | 43.6 | 6 | 15.5 | 2 |
| Dried B - Cu (ppm) | 10 | 22 | 1.5 | 1.5 | 6 | 1.5 | 2 | 0.5 |
| Percent of DMBA In Bottom Phase | 95.0 | 92.8 | 5.42$^a$ | 7.86$^a$ | 93.4 | 87.7 | 92.2 | 81.7 |

$^a$Bottom phase was the water-rich phase.

TABLE 6

| | Three-stage Washes | | | | | |
|---|---|---|---|---|---|---|
| | Example | | | | | |
| | 23 | | | 24 | | |
| Components | Stage 1 | Stage 2 | Stage 3 | Stage 1 | Stage 2 | Stage 3 |
| Crude PPE solution in toluene (g) | 500 | Stage 1 Bottom | Stage 2 Bottom | 500 | Stage 1 Bottom | Stage 2 Bottom |
| Methanol (g) | 80 | 80 | 80 | 80 | 80 | 80 |
| Toluene (g) | 31.1 | 31.1 | 31.1 | 31.1 | 31.1 | 31.1 |
| Water (g) | 0 | 20 | 20 | 20 | 20 | 20 |
| 1N H$_2$SO$_4$ (mL) | — | — | — | — | 2 | 2 |
| Wash Parameters | | | | | | |
| Agitation speed (rpm) | 450 | 450 | 450 | 450 | 450 | 450 |
| Agitation time (min) | 10 | 10 | 10 | 10 | 10 | 10 |
| Temperature (° F.) | 148.4 | 150.4 | 150.6 | 153.3 | 150.5 | 150.6 |
| Settling time (min) | 11 | — | 10 | 35 | 10 | 7 |
| Phase Amount & Density | | | | | | |
| Bottom - Amount (g) | 533.9 | 479.1 | 448.3 | 530.3 | 506.3 | 492.6 |
| Top - Amount (g) | 85.4 | 138.4 | 155.1 | 116.2 | 122.3 | 155.7 |
| Bottom - Density (kg/m$^3$) | 893 | 895 | 897 | 899 | 896 | 896 |
| Top - Density (kg/m$^3$) | 837 | 839 | 838 | 861 | 843 | 841 |
| Copper Analysis | | | | | | |
| Dried crude PPE - Cu (ppm) | 450 | 20.5 | 0.5 | 450 | 6 | 0.5 |
| Dried Bottom Phase - Cu (ppm) | 20.5 | 0.5 | 1 | 6 | 0.5 | 1 |
| Percent of DMBA In Bottom Phase | 89.9 | 83.7 | 81.3 | 90.8 | 88.3 | 82.0 |

The effects of the methanol-water wash and drying on odorous impurity content was investigated. 2,6-Dimethylcyclohexanone (DMCH), 2,3-dihydrobenzofuran (DHBF), and 2,4,6-trimethylanisole (TMA) are known odorous impurities in poly(2,6-dimethyl-1,4-phenylene ether). They are present in the 2,6-dimethylphenol monomer, and remain in the poly (2,6-dimethyl-1,4-phenylene ether) after polymerization. The amounts of DMCH, DHBF, and TMA were determined in Examples 11 (wash at 56.4° C. (133.5° F.)), 12 (wash at 66.1° C. (151° F.)), 19 (sodium hydroxide wash) and 21 (2-stage wash), and Comparative Example 2 (water wash, no methanol). A second wash was conducted in Example 21, but not in Examples 11, 12, 19 and Comparative Example 2. For each of these examples, the DMCH, DHBF, and TMA contents were measured in the crude solution, the washed solution (bottom phase), and the dried poly(2,6-dimethyl-1,4-phenylene ether) after washing. The dried samples were dried by vacuum drying at 125° C. and 510 millimeters of mercury. The results are summarized in Table 7. All amounts are in units of parts per million (ppm), based on the weight of poly(2,6-dimethyl-1,4-phenylene ether).

TABLE 7

Effect of Wash and Oven Drying on Odorous Impurity Removal

| | | Example | | | | |
|---|---|---|---|---|---|---|
| | | 11 | 12 | 19 | C. Ex. 2 | 21 |
| DMCH Amounts (ppm) | Crude PPE solution | 81.1 | 91.4 | 66.5 | 66.5 | 74.6 |
| | Washed PPE solution in toluene - First stage | 83.6 | 82.5 | 72.6 | 65.6 | 81.6 |
| | Dried PPE - First stage | 5.5 | 1.8 | 4.4 | 5.7 | 15.4 |
| | Washed PPE solution in toluene - Second stage | — | — | — | — | 66.6 |
| | Dried PPE - Second stage | — | — | — | — | 5.7 |
| TMA Amounts (ppm) | Crude PPE solution in toluene | 48.1 | 48.9 | 23.1 | 21.7 | 28.8 |
| | Washed PPE solution in toluene - First stage | 46.5 | 49.8 | 21.0 | 20.6 | 25.5 |
| | Dried PPE - First stage | 1 | 0 | 0 | 0 | 1.8 |
| | Washed PPE solution in toluene - Second stage | — | — | — | — | 25.6 |
| | Dried PPE - Second stage | — | — | — | — | 0.7 |
| DHBF Amounts | Less than 0.05 weight percent in every sample | | | | | |

The data in Table 7 indicate that the methanol-water wash itself does not significantly reduce the odorous impurity content. The differences in the amounts of odorous impurities in each example before and after washing are less than the experimental error of the measurements. Thus, the amounts of odorous impurities in the PPE solutions in toluene before and after washing are essentially the same. However, vacuum drying at 125° C. and 510 millimeters mercury reduces the odorous impurity content considerably. Since drying is required to isolate dry poly(2,6-dimethyl-1,4-phenylene ether) anyway, it is not necessary that the methanol-water wash remove the odorous impurities. They will be removed by the drying step instead.

The copper content of the dried poly(2,6 dimethyl-1,4-phenylene ether) powder obtained by methanol precipitation (Comparative Example 1) was 0.5 ppm. As can be seen from Examples 23 and 24, a dried poly(2,6 dimethyl-1,4-phenylene ether) copper content of 0.5 ppm was also obtained after two methanol-water washes. Addition of a chelating agent, such as an alkali metal salt of nitrilotriacetic acid (NTA) or an alkali metal salt of ethylenediaminotetraacetic acid (EDTA), to one or more of the methanol-water washes is expected to further reduce the copper content beyond the reduction obtained with the methanol-water wash in the absence of chelating agent.

The effect of various purification methods on the color of poly(2,6-dimethyl-1,4-phenylene ether) was also investigated. Low color is desirable in many commercial applications of poly(2,6-dimethyl-1,4-phenylene ether). The color of poly(2,6-dimethyl-1,4-phenylene ether) is adversely affected by colored impurities. Yellowness index (YI) was measured on the poly(2,6-dimethyl-1,4-phenylene ether) obtained in Comparative Examples 1 (methanol precipitation) and 3 (water wash), Example 20 (sodium hydroxide wash) and Examples 22 (2-stage methanol-water wash) and 23 (3-stage methanol-water wash). In order to obtain films for YI measurement, 2 grams of the dried poly(2,6-dimethyl-1,4-phenylene ether) powder was pressed into a film in a 18.1 metric ton (20 ton) PHI Lab Press, model number SP210H-X3-6 with 20.3×20.3 centimeter (8"×8") hot plates. The temperature of the two hot plates was maintained at 260° C., and a load of 453.6 kilograms (1,000 pounds) was applied for 1 minute and then 1,361 kilograms (3,000 pounds) for 2 minutes. The YI was measured at three different points on the film, and the average values are reported in Table 8.

TABLE 8

Effect of Water-methanol Wash on Yellowness Index

| Example | Sample | YI |
|---|---|---|
| C. Ex. 1 | After methanol precipitation and 2 methanol washes | 23.3 |
| C. Ex. 3 | Crude PPE solution in toluene | 23.5 |
| | After 1 water wash | 21.9 |
| 22 | Crude PPE solution in toluene | 23.5 |
| | After 2 washes | 17.2 |
| 23 | Crude PPE solution in toluene | 41.4 |
| | After 1 wash | 23.9 |
| | After 2 washes | 21.3 |
| | After 3 washes | 21.5 |
| 20 | Crude PPE solution in toluene | 24.1 |
| | After 1 wash | 27.1 |

Surprisingly, two methanol-water washes is sufficient to reduce the yellowness index below what is obtained by methanol precipitation, which uses 15 times more methanol. Example 22, with two methanol-water washes, had a yellowness index of 17.2 and Example 23 had a yellowness index of 21.3 after 2 methanol-water washes, while Comparative Example 1 (methanol precipitation) had a yellowness index of 23.3. Without being bound by theory, the methanol-water wash reduces the color of the poly(2,6-dimethyl-1,4-phenylene ether) because the colored impurities have a higher affinity for the methanol-rich phase, and are extracted into the methanol-rich phase from the toluene-rich phase containing the poly(2,6-dimethyl-1,4-phenylene ether). Since colored impurities are extracted into the methanol-rich phase, efficient separation of the toluene-rich phase from the methanol-rich phase increases the removal of colored impurities. In the methanol precipitation and filtration process of Comparative Example 1, colored impurities can be present in residual methanol in the filter cake, and remain with the poly(2,6-dimethyl-1,4-phenylene ether) upon evaporative removal of the methanol. As can be seen from Comparative Example 3, a water wash with no methanol, is not very effective in reducing yellowness index in comparison to methanol-water washes (Examples 22 and 23). The increase in yellow index from 24.1 to 27.1 in Example 20 after one wash was caused by the use of sodium hydroxide in the wash. Without being bound by theory, the higher color resulted from the reaction of the sodium hydroxide with phenolic end groups in the PPE or with phenolic impurities to form sodium phenolate salts. Sodium phenolate salts are known to be colored. Thus, when low color is an important end-use property of the poly(2,6-dimethyl-1,4-phenylene ether), the use of sodium hydroxide in the methanol-water washes should be avoided.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of purifying a poly(phenylene ether), comprising:
   mixing
      a poly(phenylene ether) solution comprising a poly(phenylene ether) and a poly(phenylene ether) solvent selected from the group consisting of toluene, xylenes, mesitylene, chlorobenzene, dichlorobenzenes, chloroform, and combinations thereof, and
      first washing solvents comprising a C1-C4 alkanol and water to form
      a first liquid phase comprising poly(phenylene ether) and poly(phenylene ether) solvent, and
      a second liquid phase comprising C1-C4 alkanol and water; and
   separating the first liquid phase from the second liquid phase;
   wherein the first liquid phase and the second liquid phase are present in a volume ratio of about 1.5:1 to about 10:1;
   wherein the first and second liquid phases combined comprise, based on 100 weight percent total of the poly(phenylene ether) solvent, the C1-C4 alcohol, and the water,
      about 60 to about 95 weight percent poly(phenylene ether) solvent,
      about 4 to about 32 weight percent C1-C4 alkanol, and
      about 1 to about 36 weight percent water; and
   wherein the first liquid phase comprises at least 95 weight percent of the poly(phenylene ether) in solution.

2. The method of claim 1, wherein the total amount of C1-C4 alkanol and water in the first and second liquid phases combined is at least 10 weight percent, based on 100 weight percent total of the poly(phenylene ether) solvent, the C1-C4 alkanol, and the water.

3. The method of claim 1, wherein the first and second liquid phases combined comprise, based on 100 weight percent total of the poly(phenylene ether) solvent, the C1-C4 alcohol, and the water, about 60 to about 81 weight percent poly(phenylene ether) solvent, about 4 to about 32 weight percent C1-C4 alkanol, and about 18 to about 36 weight percent water.

4. The method of claim 1, wherein the first and second liquid phases combined comprise, based on 100 weight percent total of the poly(phenylene ether) solvent, the C1-C4 alcohol, and the water, about 67 to about 95 weight percent poly(phenylene ether) solvent, about 25 to about 32 weight percent C1-C4 alkanol, and about 1 to about 18 weight percent water.

5. The method of claim 1, wherein the first and second liquid phases combined comprise, based on 100 weight percent total of the poly(phenylene ether) solvent, the C1-C4 alcohol, and the water, about 60 to about 95 weight percent poly(phenylene ether) solvent, about 4 to about 25 weight percent C1-C4 alkanol, and about 1 to about 18 weight percent water.

6. The method of claim 1, wherein the first liquid phase comprises, based on 100 weight percent total of the poly(phenylene ether) solvent, the C1-C4 alcohol, and the water, in the first liquid phase, about 70 to about 98 weight percent poly(phenylene ether) solvent, about 1 to about 25 weight percent C1-C4 alkanol, and about 1 to about 18 weight percent water.

7. The method of claim 1, wherein the poly(phenylene ether) comprises a bifunctional poly(phenylene ether) having the structure

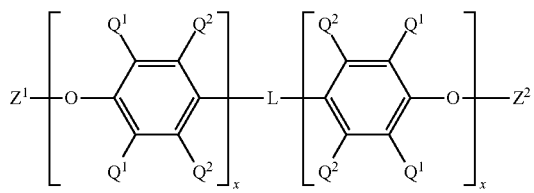

wherein each occurrence of $Q^1$ is independently halogen, unsubstituted $C_1$-$C_{12}$ hydrocarbyl or $C_1$-$C_{12}$ hydrocarbyl substituted with a carbonyl group, an amino group, or a hydroxyl group, with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^2$ is independently hydrogen, halogen, unsubstituted $C_1$-$C_{12}$ hydrocarbyl or $C_1$-$C_{12}$ hydrocarbyl substituted with a carbonyl group, an amino group, or a hydroxyl group, with the proviso that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of x is independently 0 to about 100, provided that the sum of each occurrence of x is at least three; $Z^1$ and $Z^2$ are each independently

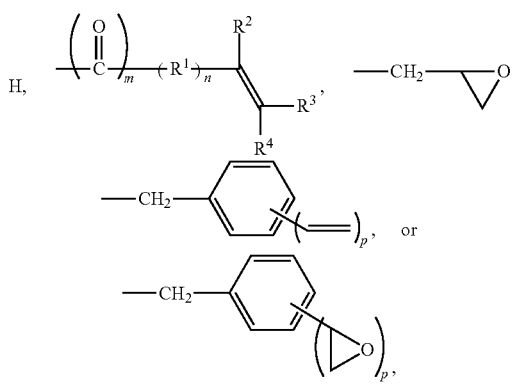

wherein each occurrence of $R^1$ is $C_1$-$C_{12}$ hydrocarbylene; each occurrence of m is independently 0 or 1; each occurrence of n is independently 0 or 1; each occurrence of p is independently 0-3, each occurrence of $R^2$-$R^4$ is independently hydrogen or $C_1$-$C_{18}$ hydrocarbyl; and L has the structure

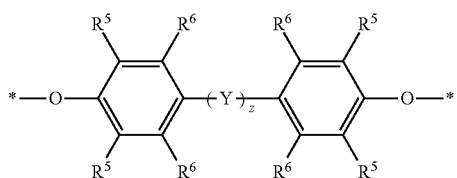

wherein each occurrence of $R^5$ and $R^6$ is independently hydrogen, halogen, unsubstituted $C_1$-$C_{12}$ hydrocarbyl or $C_1$-$C_{12}$ hydrocarbyl substituted with a carbonyl group, an amino group, or a hydroxyl group, provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; z is 0 or 1; and Y has the structure

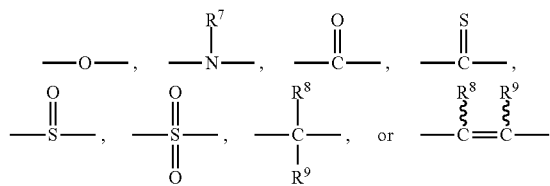

wherein $R^7$, $R^8$, and $R^9$ are each independently hydrogen, or $C_1$-$C_{12}$ hydrocarbyl.

8. The method of claim 1, wherein the poly(phenylene ether) solution comprises about 5 to about 40 weight percent poly(phenylene ether), based on the total weight of the poly (phenylene ether) and the poly(phenylene ether) solvent in the poly(phenylene ether) solution, at about 30 to about 70° C.

9. The method of claim 1, wherein the first washing solvents further comprise poly(phenylene ether) solvent.

10. The method of claim 1, wherein the poly(phenylene ether) solvent is selected from the group consisting of toluene, xylenes, mesitylene, chlorobenzene, dichlorobenzenes, and combinations thereof.

11. The method of claim 1, wherein the poly(phenylene ether) solvent comprises toluene.

12. The method of claim 1, wherein the C1-C4 alkanol comprises methanol.

13. The method of claim 1, wherein
the poly(phenylene ether) solution further comprises a catalyst metal ion;
a chelating agent is dissolved in the first washing solvents; and
wherein the first and second liquid phases combined comprise a ratio of moles of chelating agent to moles of catalyst metal ion of about 1:1 to about 10:1.

14. The method of claim 13, wherein the chelating agent is selected from the group consisting of polyalkylenepolyamine polycarboxylic acids, aminopolycarboxylic acids, aminocarboxylic acids, polycarboxylic acids, alkali metal salts of the foregoing acids, alkaline earth metal salts of the foregoing acids, mixed alkali metal-alkaline earth metal salts of the foregoing acids, and combinations thereof.

15. The method of claim 1, wherein less than 10 parts per million by weight of a chelating agent, based on the total weight of the first washing solvents, is dissolved in the first washing solvents.

16. The method of claim 1, wherein the poly(phenylene ether) solution further comprises less than or equal to 900 parts per million by weight of catalyst metal ion, based on the weight of poly(phenylene ether).

17. The method of claim 1, wherein the poly(phenylene ether) solution further comprises less than or equal to 100 parts per million by weight of catalyst metal ion, based on the weight of poly(phenylene ether).

18. The method of claim 1, wherein the first liquid phase is more dense than the second liquid phase.

19. The method of claim 1, wherein the separating comprises separating by gravity.

20. The method of claim 1, further comprising:
mixing
the separated first liquid phase and
second washing solvents comprising a C1-C4 alkanol and water to form
a third liquid phase comprising poly(phenylene ether) and poly(phenylene ether) solvent, and
a fourth liquid phase comprising C1-C4 alkanol and water; and
separating the third liquid phase from the fourth liquid phase;
wherein the separated first liquid phase and the second washing solvents are mixed in a volume ratio of about 1.5:1 to about 10:1;
wherein the third and fourth liquid phases combined comprise, based on 100 weight percent total of the poly (phenylene ether) solvent, the C1-C4 alcohol, and the water,
about 60 to about 95 weight percent poly(phenylene ether) solvent,
about 4 to about 32 weight percent C1-C4 alkanol, and
about 1 to about 36 weight percent water; and
wherein the third liquid phase comprises at least 95 weight percent of the poly(phenylene ether) in solution.

21. The method of claim 20, further comprising:
mixing
the separated third liquid phase and
third washing solvents comprising a C1-C4 alkanol and water to form
a fifth liquid phase comprising poly(phenylene ether) and poly(phenylene ether) solvent, and
a sixth liquid phase comprising C1-C4 alkanol and water; and separating the fifth liquid phase from the sixth liquid phase;
wherein the separated third liquid phase and the third washing solvents are mixed in a volume ratio of about 1.5:1 to about 10:1;
wherein the fifth and sixth liquid phases combined comprise, based on 100 weight percent total of the poly(phenylene ether) solvent, the C1-C4 alcohol, and the water,
about 60 to about 95 weight percent aromatic hydrocarbon solvent,
about 4 to about 32 weight percent C1-C4 alkanol, and
about 1 to about 36 weight percent water; and
wherein the fifth liquid phase comprises at least 95 weight percent of the poly(phenylene ether) in solution.

22. The method of claim 1, further comprising isolating the poly(phenylene ether) from the separated first liquid phase.

23. The method of claim 22, wherein the isolating comprises using an isolation method selected from the group consisting of devolatilizing extrusion, devolatizing on a thin film evaporator, low temperature vacuum devolatilization, spray drying, steam precipitation, crumb formation with hot water, and combinations thereof.

24. The method of claim 22, wherein the poly(phenylene ether) isolated from the separated first liquid phase has less than or equal to 100 parts by million by weight of catalyst metal ion.

25. The method of claim 22, wherein the poly(phenylene ether) isolated from the separated first liquid phase has a yellowness index of less than or equal to 30, as measured in accordance with ASTM E 313-00 and D 1925-70.

26. A method of purifying a poly(phenylene ether), comprising:
mixing
a poly(phenylene ether) solution comprising a poly(phenylene ether) and toluene, and
first washing solvents comprising methanol and water to form
a first liquid phase comprising poly(phenylene ether) and toluene, and
a second liquid phase comprising methanol and water; and
separating the first liquid phase from the second liquid phase;
wherein the poly(phenylene ether) solution and the first washing solvents are mixed in a volume ratio of about 2:1 to about 7:1;
wherein the first and second liquid phases combined comprise, based on 100 weight percent total of the toluene, the methanol, and the water,
about 60 to about 90 weight percent toluene,
about 9 to about 25 weight percent methanol, and
about 1 to about 10 weight percent water; and
wherein the first liquid phase comprises at least 95 weight percent of the poly(phenylene ether) in solution.

27. The method of claim 1, wherein the poly(phenylene ether) solution comprises about 5 to about 20 weight percent poly(phenylene ether), based on the total weight of the poly(phenylene ether) and the poly(phenylene ether) solvent in the poly(phenylene ether) solution, at about 30 to about 70° C.

* * * * *